United States Patent
Bonitz et al.

(10) Patent No.: US 7,365,921 B2
(45) Date of Patent: Apr. 29, 2008

(54) LENS AND PROJECTION HEADLIGHT OF A MOTOR VEHICLE INCLUDING SAME

(75) Inventors: Ralf Bonitz, Mainz (DE); Rainer Adebahr, Gruenenplan (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/510,433

(22) PCT Filed: Apr. 8, 2003

(86) PCT No.: PCT/EP03/03622

§ 371 (c)(1),
(2), (4) Date: Oct. 6, 2004

(87) PCT Pub. No.: WO03/087893

PCT Pub. Date: Oct. 23, 2003

(65) Prior Publication Data

US 2005/0146797 A1    Jul. 7, 2005

(30) Foreign Application Priority Data

Apr. 16, 2002 (DE) .............................. 102 16 706

(51) Int. Cl.
*G02B 7/02* (2006.01)
(52) U.S. Cl. .................. 359/811; 359/819; 359/813
(58) Field of Classification Search ............... 359/819, 359/811, 813, 815, 619–628; 349/95; 347/241, 347/244
See application file for complete search history.

(56) References Cited

U.S. PATENT DOCUMENTS 2,398,676 A    4/1946    Snyder et al.
4,698,089 A    10/1987   Matsuzaka et al.
4,895,585 A    1/1990    Angenent et al.
5,905,599 A *  5/1999    Nomura et al. ............. 359/819

(Continued)

FOREIGN PATENT DOCUMENTS

DE    1 142 992    1/1963

(Continued)

OTHER PUBLICATIONS

Annual Report 1999, High Precision Machining of Dies Compression Moulding, Division for Munimum-Damage Machining, Wolter Doell, Frauhofer Institut Werkstoffmechanik. (With English Translation).

(Continued)

*Primary Examiner*—Ricky Mack
*Assistant Examiner*—Brandi N. Thomas
(74) *Attorney, Agent, or Firm*—Michael J. Striker

(57) ABSTRACT

The plano-convex lens of a projection headlight has a holding edge (4) integrally formed on an outer lens edge and a supporting edge (5) projecting from its plane surface (3) and formed integrally with the holding edge (4). The supporting edge (5) and the holding edge (4) form a continuous cylindrical outer circumferential surface (45) extending over their outer sides. The convex surface (2) and the plane surface (3) of the lens are bright pressed surfaces so that the grinding and polishing steps usually used in making the lens can be eliminated. The method of manufacturing the lens including bright pressing the convex and plane surfaces is also part of the invention.

11 Claims, 1 Drawing Sheet

U.S. PATENT DOCUMENTS

| | | |
|---|---|---|
| 6,382,822 B1 | 5/2002 | Maekawa et al. |
| 6,406,171 B1 | 6/2002 | Satsukawa et al. |
| 6,469,844 B1 * | 10/2002 | Iwase et al. ............... 359/819 |
| 6,898,026 B2 * | 5/2005 | Jewers et al. .............. 359/738 |
| 2002/0109925 A1 * | 8/2002 | Miura ...................... 359/719 |
| 2005/0146797 A1 | 7/2005 | Bonitz et al. |

FOREIGN PATENT DOCUMENTS

| | | |
|---|---|---|
| DE | 295 01 341.9 | 1/1995 |
| DE | 196 33 164 | 2/1998 |
| DE | 100 01 860 A1 | 8/2000 |
| DE | 100 23 754 A1 | 3/2001 |
| DE | 100 43 065 | 3/2002 |
| DE | 102 16 706 | 11/2003 |
| DE | 203 20 546 | 3/2005 |
| EP | 0 308 010 A1 | 3/1989 |
| EP | 0 901 029 | 3/1999 |
| FR | 2 415 607 | 8/1979 |
| JP | 59-157603 A | 9/1984 |
| JP | 59-177506 | 10/1984 |
| JP | 01183611 | 7/1989 |
| JP | 6009231 | 1/1994 |
| JP | 09208240 | 8/1997 |

OTHER PUBLICATIONS

Patent Abstract of Japan JP 59177506, Oct. 8, 1984.

Patent Abstract of Japan JP 59157603.

DIN ISO 10110-5. "Optics and Optical Instruments Preparation of Drawings for Optical Elements and Systems" Part 5: Surface Form Tolerances. (ISO 10110-5: 1996; Technical Corrigendum 1 : 1996). Feb. 2000. (English Translation).

* cited by examiner

LENS AND PROJECTION HEADLIGHT OF A MOTOR VEHICLE INCLUDING SAME

BACKGROUND OF THE INVENTION

The invention relates to a lens having a curved surface and a plane surface on opposite sides, and a holding edge molded on the lens edge as well as a supporting edge projecting from the plane surface and molded on the holding edge, to use of the lens and to a method of manufacture of the lens.

J59-177506A describes lenses of a projection objective wherein the two external lenses of the objective have a supporting edge which projects towards the plane lens surface and is designed as stepped. The shoulder thereby produced is used for support on a further lens, namely a biconvex lens, with the aim of specifying a distance between the lenses.

JP59-157603A shows two lenses which have supporting edges having projections with inclined surfaces provided on their outer circumference. As a result of this configuration, importance is placed on high precision and stability of the edges.

In this respect, the supporting edges in both of the foregoing cited prior art references are designed and constructed according to their mounting configuration with further lenses.

Such lenses have conventionally been pressed into an aspherical shape on one side and subjected to a grinding process to form a plane surface on the other side. This grinding process, which is followed by another polishing process, is carried out after passage through a cooling furnace. The passage through a cooling furnace is necessary to specifically cool the still hot blank so that stresses inside the lens can be removed. In this case, however, the blank must be placed on a conveyer belts, whereby the supporting surface of the lens is disadvantageously influenced. However, if the passage through the cooling furnace is followed by a grinding process, these surface deformations are eliminated.

However, this method has the disadvantage that additional grinding and polishing processes are required.

SUMMARY OF THE INVENTION

The object of the invention is to provide a lens and a method of manufacture in which such a finishing process such as grinding and polishing is dispensed with. The object also relates to the specification of a particular use.

This object is solved by a lens which is pressed bright on both sides. As a result of said bright pressing on both sides, corresponding finishing processes are dispensed with. Said bright pressing is thereby possible because a supporting edge is present which has the advantage that when placed on a base, the lens abuts exclusively with this supporting edge and contact of the plane surface and the base is avoided so that the plane lens surface is not damaged. A lens pressed bright on both sides with a supporting edge can thus be placed without any problems on a conveyor belt, for example, of a cooling furnace.

The supporting edge is preferably molded onto the outer circumference of the lens. Since the holding edge is molded on the outer circumferential edge of the lens and the supporting edge is molded on this holding edge, the supporting edge is located outside the ray path and thus outside the optically active surface of the lens.

The thickness D of the supporting edge is at least 0.2 mm. This minimum thickness is required so that any unevenness on the supporting surface, especially on a cooling belt, does not lead to any contact with the plane surface.

The width $B_1$ of the supporting edge is preferably less than or equal to the width $B_2$ of the holding edge.

Preferably, a lens pressed bright on both sides comprising a curved surface, a plane surface and a holding edge molded on the lens edges, on which is molded a supporting edge projecting or protruding from the plane surface, is used for projection headlights for motor vehicles.

The method for the manufacture of a lens comprising a curved surface and a plane surface provides that a holding edge is molded on the lens edge and a supporting edge which protrudes from the plane surface is molded on the holding edge and that both surfaces are pressed bright.

The lens is preferably placed on the supporting edge during the cooling process.

BRIEF DESCRIPTION OF THE DRAWINGS

An exemplary embodiment of the invention is described in detail below with reference to the drawings.

In the figures.

DESCRIPTION OF THE PREFERRED EMBODIMENTS

Figure 1:
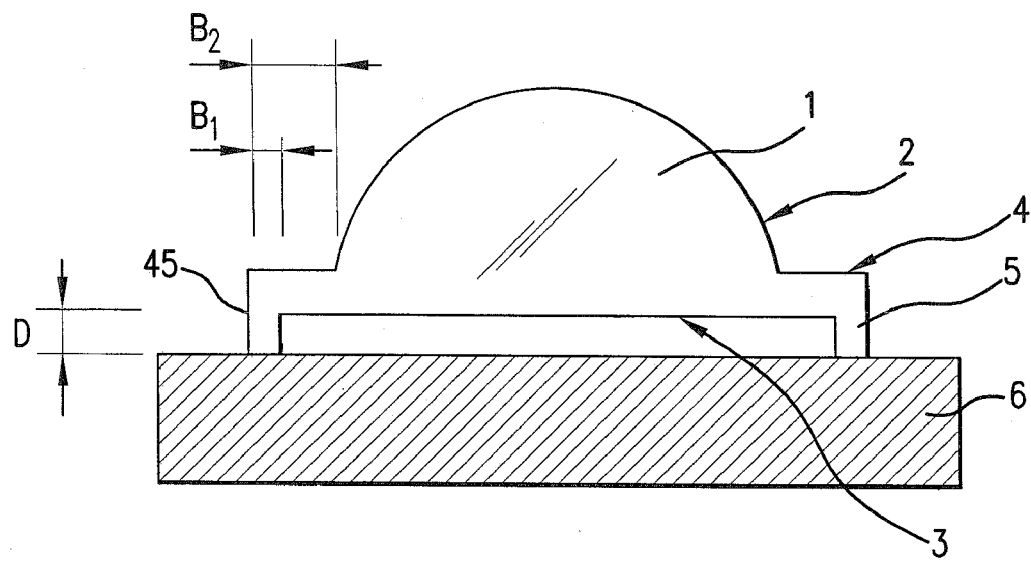
FIG. 1 is a cross-sectional view through a plano-convex lens according to the invention, which is resting on a base via its supporting edge.

FIG. 1 shows a cross-sectional view of the plano-convex lens 1 according to the invention. The plano-convex lens has an aspherical convex surface 2 and a plane surface 3. Molded onto the outer edge of the lens 1 is a holding edge 4, which in its outer region goes over into a supporting edge 5 which projects from the plane surface 3. The lens is supported on a base 6 only by means of the supporting edge 5 so that the plane lens surface 3 cannot be damaged. The supporting edge 5 projects from the surface 3 by its thickness D of around 0.3 mm. The width $B_1$ of the supporting edge 5 is less than the width $B_2$ of the holding edge 4, measured in a direction parallel to the plane lens surface 3, so that the optically active area of the plane surface 3 is not restricted. If the glass lens 1 is pressed bright on both sides, it can be stored and transported without any problems after the bright pressing process or it can be supplied to further process steps with regard to cooling without the lens surface being damaged thereby.

The supporting edge 5 and holding edge 4 together from a continous cylindrical outer circumferential surface 45 of the lens, which extends over an outer side of both the supporting edge 5 and the holding edge 4 as well as around an outer circumference of the lens. The supporting edge 5 of the lens is not set back or set in from the outer peripheral edge of the lens in the preferred embodiment shown in FIG. 1.

Figure 2:
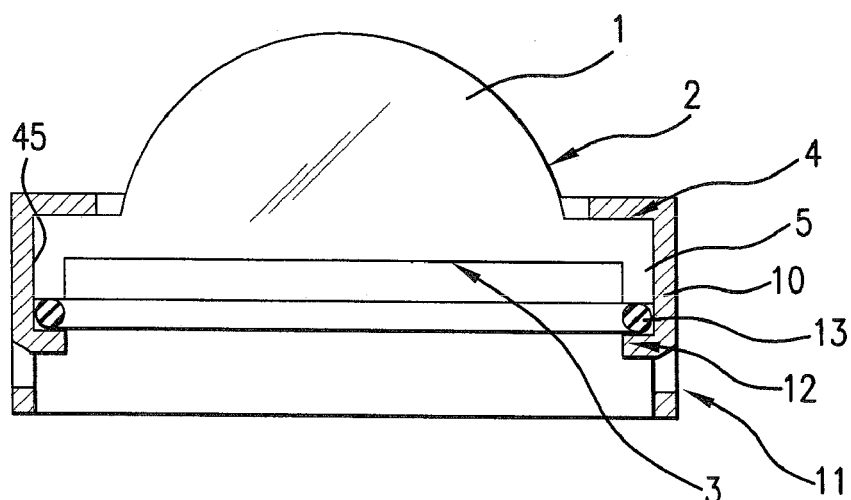
FIG. 2 is a cross-sectional view through a part of a projection headlight with the lens in the built-in state.

FIG. 2 shows the plano-convex lens 1 in the built-in state in projection headlight of a vehicle. A holder 10 embraces the holding edge 4 on its side facing the convex surface 2 of the plano-convex lens 1. The holder 10 substantially consists of a sheet-metal ring having flaps 12 stamped out on its circumferential wall 11, which are curved inwards. A circlip 13 is arranged between the flaps 12 and the supporting edges 5. By this means the lens is securely held. The advantage is that the supporting edge 5 is also used for building the lens into the headlight so that the plane surface 3 is not adversely affected by the holder.

The invention claimed is:

1. A method for making a lens having a curved surface (2) and a plane surface (3) on opposite sides thereof, and having a holding edge (4) integrally formed on a lens edge, wherein a supporting edge (5) projects from said plane surface (3) and is formed integrally with said holding edge (4), said method comprising bright pressing said curved surface and said plane surface on both of said sides.

2. A plano-convex lens having a convex surface (2) and a plane surface (3) on opposite sides thereof, and comprising a holding edge (4) and a supporting edge (5), said holding edge (4) being integrally formed on an outer circumferential edge of the lens and said supporting edge (5) projecting from said plane surface (3) and being formed integrally with said holding edge (4), and said convex surface (2) and said plane surface (3) being bright pressed surfaces;

wherein a lower surface of said holding edge (4) faces away from said convex surface (2) and is disposed in a plane that coincides with said plane surface (3); and wherein said supporting edge (5) and said holding edge (4) form a continuous cylindrical outer circumferential surface (45) extending over an outer side of said supporting edge (5) and an outer side of said holding edge (4) and around an outer circumference of the lens.

3. The plano-convex lens as defined in claim 2, wherein said supporting edge (5) has a thickness (D) of at least 0.2 mm.

4. The plano-convex lens as defined in claim 2, wherein said supporting edge (5) has a width ($B_1$), said holding edge (4) has a width ($B_2$) in a direction extending parallel to said plane surface (3) and said width of said supporting edge (5) is less than or equal to said width of said holding edge (4).

5. The plano-convex lens as defined in claim 2, consisting of a glass lens.

6. A plano-convex lens of a projection headlight of a motor vehicle, said plano-convex lens consisting of a glass lens and having a convex surface (2) and a plane surface (3) on opposite sides thereof, said plano-convex lens comprising a holding edge (4) and a supporting edge (5), said holding edge (4) being integrally formed on an outer circumferential edge of the lens and said supporting edge (5) projecting from said plane surface (3) and being formed integrally with said holding edge (4), and said convex surface (2) and said plane surface (3) being bright pressed surfaces.

7. The plano-convex lens as defined in claim 6, wherein said supporting edge (5) has a width ($B_1$), said holding edge (4) has a width ($B_2$) in a direction extending parallel to said plane surface (3) and said width of said supporting edge (5) is less than or equal to said width of said holding edge (4).

8. A projection headlight of a motor vehicle, said projection headlight comprising a plano-convex lens (1) and a holder (10) that holds said plano-convex lens (1), said plano-convex lens (1) having a convex surface (2) and a plane surface (3) on opposite sides thereof, said plano-convex lens (1) comprising a holding edge (4) and a supporting edge (5), said holding edge (4) being integrally formed on an outer circumferential edge of the lens, said supporting edge (5) projecting from said plane surface (3) and being formed integrally with said holding edge (4), said convex surface (2) and said plane surface (3) being bright pressed surfaces, a lower surface of said holding edge (4) facing away from said convex surface (2) and being disposed in a plane that coincides with said plane surface (3), and said supporting edge (5) and said holding edge (4) forming a continuous cylindrical outer circumferential surface (45) that extends over an outer side of said supporting edge (5) and an outer side of said holding edge (4) and around an outer circumference of the lens; and said holder (10) embracing said holding edge (4) on a side of said lens having said convex surface (2), said holder (10) substantially consisting of a sheet metal ring, said sheet metal ring comprising a circumferential wall (11), said circumferential wall (11) extending circumferentially around said holding edge (4) and said supporting edge (5), said circumferential wall (11) bearing on the continuous cylindrical outer circumferential surface (45), and said circumferential wall (11) being provided with inwardly curved flaps (12) that are engaged under the supporting edge (5) to securely hold the lens (1) in the holder (10).

9. The projection headlight as defined in claim 8, wherein said supporting edge (5) has a width ($B_1$), said holding edge (4) has a width ($B_2$) in a direction extending parallel to said plane surface (3) and said width of said supporting edge (5) is less than or equal to said width of said holding edge (4).

10. A projection headlight of a motor vehicle, said projection headlight comprising a plano-convex lens (1) and a holder (10) that holds said plano-convex lens (1), said plano-convex lens (1) consisting of a glass lens and having a convex surface (2) and a plane surface (3) on opposite sides thereof, said plano-convex lens comprising a holding edge (4) and a supporting edge (5), said holding edge (4) being integrally formed on an outer circumferential edge of the lens and said supporting edge (5) projecting from said plane surface (3) and being formed integrally with said holding edge (4), and said convex surface (2) and said plane surface (3) being bright pressed surfaces; and said holder (10) embracing said holding edge (4) on a side of said lens having said convex surface (2), said holder (10) substantially consisting of a sheet metal ring, said sheet metal ring comprising a circumferential wall (11), said circumferential wall (11) extending circumferentially around said holding edge (4) and said supporting edge (5), said circumferential wall (11) bearing on a continuous cylindrical outer circumferential surface (45) of said supporting edge (5) and said holding edge (4), and said circumferential wall (11) being provided with inwardly curved flaps (12) that are engaged under the supporting edge (5) to securely hold the lens (1) in the holder (10).

11. The projection headlight as defined in claim 10, wherein said supporting edge (5) has a width ($B_1$), said holding edge (4) has a width ($B_2$) in a direction extending parallel to said plane surface (3) and said width of said supporting edge (5) is less than or equal to said width of said holding edge (4).

* * * * *

UNITED STATES PATENT AND TRADEMARK OFFICE
CERTIFICATE OF CORRECTION

PATENT NO. : 7,365,921 B2
APPLICATION NO. : 10/510433
DATED : April 29, 2008
INVENTOR(S) : R. Bonitz et al.

It is certified that error appears in the above-identified patent and that said Letters Patent is hereby corrected as shown below:

Title page, item (75) add: Frank Peters, Delligsen (DE)

Signed and Sealed this

Twenty-second Day of July, 2008

JON W. DUDAS
*Director of the United States Patent and Trademark Office*